United States Patent
Markham

(10) Patent No.: US 10,836,297 B2
(45) Date of Patent: Nov. 17, 2020

(54) METHOD FOR STAGING DELIVERIES USING ROLL-OFF CONTAINERS

(71) Applicant: The Modern Group, Ltd., Beaumont, TX (US)

(72) Inventor: Gary R. Markham, Lumberton, TX (US)

(73) Assignee: The Modern Group, Ltd., Beaumont ( * ) Notice: Subject to any disclaimer, the term of this patent is extended or adjusted under 35 U.S.C. 154(b) by 253 days.

(21) Appl. No.: 15/496,070

(22) Filed: Apr. 25, 2017

(65) Prior Publication Data

US 2018/0305141 A1 Oct. 25, 2018

Related U.S. Application Data

(63) Continuation-in-part of application No. 15/449,270, filed on Mar. 3, 2017, now Pat. No. 10,759,595.

(51) Int. Cl.
| | |
|---|---|
| *B60P 1/52* | (2006.01) |
| *G06Q 10/08* | (2012.01) |
| *G06Q 50/28* | (2012.01) |
| *B61D 3/20* | (2006.01) |

(52) U.S. Cl.
CPC .......... *B60P 1/52* (2013.01); *G06Q 10/0832* (2013.01); *G06Q 50/28* (2013.01); *B61D 3/20* (2013.01)

(58) Field of Classification Search
CPC .................................. B61D 3/005; B60P 1/52
See application file for complete search history.

(56) References Cited

U.S. PATENT DOCUMENTS

| | | | | |
|---|---|---|---|---|
| 3,611,905 A | * | 10/1971 | Brinks | B61D 5/004 454/88 |
| 3,841,505 A | * | 10/1974 | Kent | B65F 3/28 414/787 |
| 4,909,556 A | * | 3/1990 | Koskinen | B65G 53/12 105/243 |
| 4,922,571 A | * | 5/1990 | Driear | E03F 7/10 134/168 C |
| 5,580,193 A | * | 12/1996 | Battle | B60P 1/60 406/108 |
| 7,104,385 B2 | * | 9/2006 | Pearson | B60P 1/60 406/145 |
| 8,505,780 B2 | * | 8/2013 | Oren | B65D 88/32 222/185.1 |
| 8,585,341 B1 | * | 11/2013 | Oren | B65G 65/42 414/411 |
| 9,475,661 B2 | | 10/2016 | Oren | |
| 10,406,962 B2 | * | 9/2019 | Hughes | B60P 1/483 |
| 2003/0077157 A1 | * | 4/2003 | Smith | B60D 1/145 414/491 |
| 2004/0151564 A1 | * | 8/2004 | Waguespack | B60P 1/16 414/491 |

(Continued)

FOREIGN PATENT DOCUMENTS

WO      2017044680 A1      3/2017

*Primary Examiner* — Saul Rodriguez
*Assistant Examiner* — Ashley K Romano
(74) *Attorney, Agent, or Firm* — Adolph Locklar

(57) ABSTRACT

A roll-off container is filled with a material at a loading site to produce a filled roll-off container. The filled roll-off container is transported on a transport vehicle to a use site. The filled roll-off container is rolled from the transport vehicle at the use site. The material is used at the use site.

13 Claims, 6 Drawing Sheets

(56) References Cited

U.S. PATENT DOCUMENTS

| | | | | |
|---|---|---|---|---|
| 2005/0109870 A1* | 5/2005 | Krise | B60P 1/6463 | |
| | | | 242/557 | |
| 2013/0142601 A1* | 6/2013 | McIver | B60P 1/6427 | |
| | | | 414/288 | |
| 2014/0023465 A1* | 1/2014 | Oren | B65D 88/30 | |
| | | | 414/288 | |
| 2014/0069728 A1* | 3/2014 | Lustenberger | G01G 19/12 | |
| | | | 177/1 | |
| 2014/0083554 A1* | 3/2014 | Harris | B65D 88/32 | |
| | | | 141/1 | |
| 2014/0166647 A1* | 6/2014 | Sheesley | B65D 90/66 | |
| | | | 220/1.5 | |
| 2015/0086308 A1* | 3/2015 | McIver | B60P 1/6427 | |
| | | | 414/323 | |
| 2015/0224905 A1* | 8/2015 | Oren | B60P 1/56 | |
| | | | 414/518 | |
| 2016/0340111 A1* | 11/2016 | DiSorbo | B60P 1/52 | |
| 2017/0313499 A1* | 11/2017 | Hughes | B60P 1/483 | |
| 2017/0355293 A1* | 12/2017 | Marmur | B60P 1/30 | |
| 2018/0079347 A1* | 3/2018 | Ellis | B60P 1/6454 | |
| 2018/0104622 A1* | 4/2018 | Dawson | B01D 21/10 | |

\* cited by examiner

US 10,836,297 B2

METHOD FOR STAGING DELIVERIES USING ROLL-OFF CONTAINERS

CROSS REFERENCE TO RELATED APPLICATIONS

This application is a nonprovisional application that claims priority from U.S. nonprovisional application Ser. No. 15/449,270, filed Mar. 3, 2017.

BACKGROUND

In recent years, large deposits of hydrocarbons have become accessible to production through the use of hydraulic fracturing. Hydraulic fracturing uses fluids at high pressures to fracture underground formations to allow previously-trapped hydrocarbons to flow into a well and to the surface for collection and use. Hydraulic proppants are often pumped into the newly-formed fractures to keep them open after the hydraulic pressure is removed. Hydraulic fracturing often consumes a large volume of hydraulic proppants.

FIGS. 1 and 2 illustrate a prior art delivery system for proppants used in hydraulic fracturing. Hydraulic proppants are acquired at a source location 102, such as a mine. The proppants are shipped by rail 104 to a location 106, such as a transload yard. The proppants may be stored at location 106 for a period of time. They are then transported by truck 110 from the location 106 to the well 108 by a truck 110. If hydraulic fracturing equipment 112 at the well 108 does not have an immediate need for hydraulic proppants carried by the truck 110, the truck 110 and the truck driver may be idled waiting for the need to hydraulic proppants to arise. In most cases, the truck 110 and the truck driver driving the truck 110 cost money (rent for the truck 110 and pay for the truck driver) even when they are idled. In some circumstances, the uneven demand at a well 108 for hydraulic proppants, the typically long distance from the source location 102 to the well 108, and the often-poor quality of the roads on the route between the source location 102 and the well 108 may result in a long line 114 of idled trucks and truck drivers waiting their turn to deliver hydraulic proppants to the well 108. Efficiently delivering proppant to a well is a challenge.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

Figure 1:
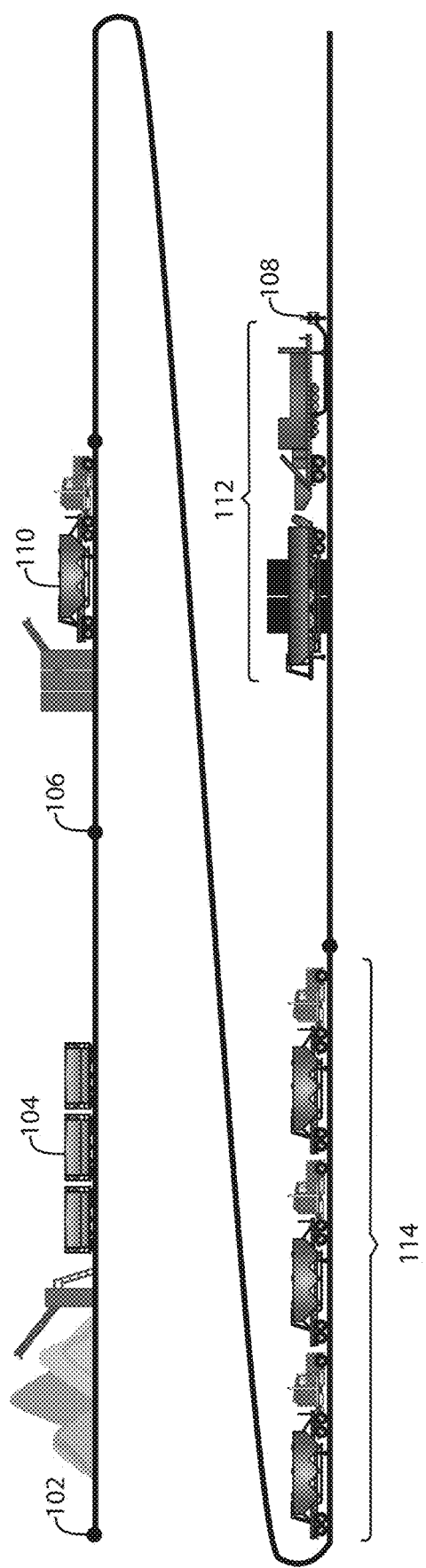
FIG. 1 illustrates a prior art delivery system for proppants used in hydraulic fracturing.
Figure 2:
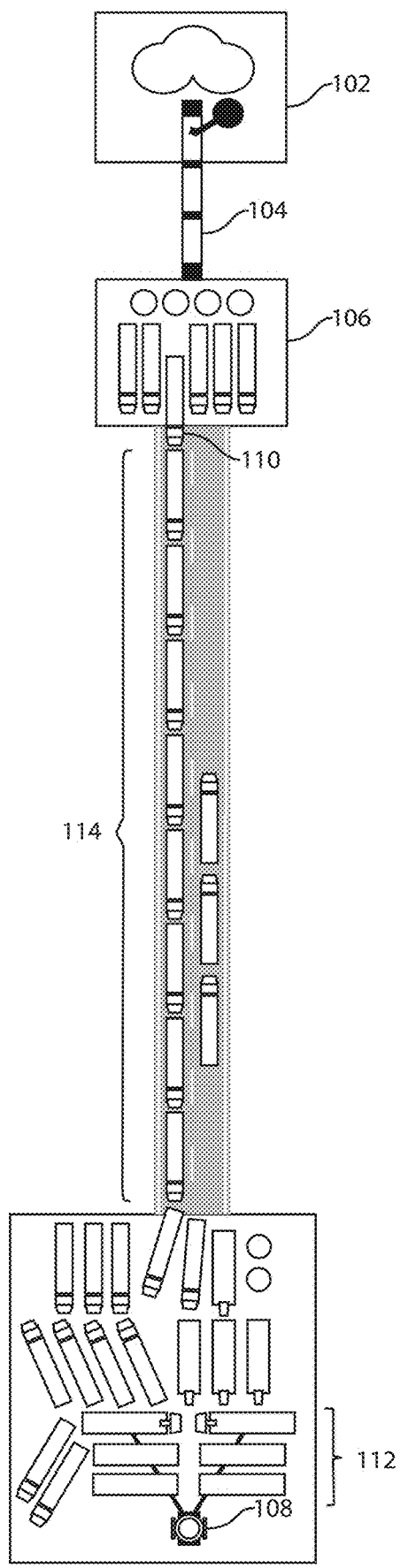
FIG. 2 illustrates a prior art delivery system for proppants used in hydraulic fracturing.
Figure 3:
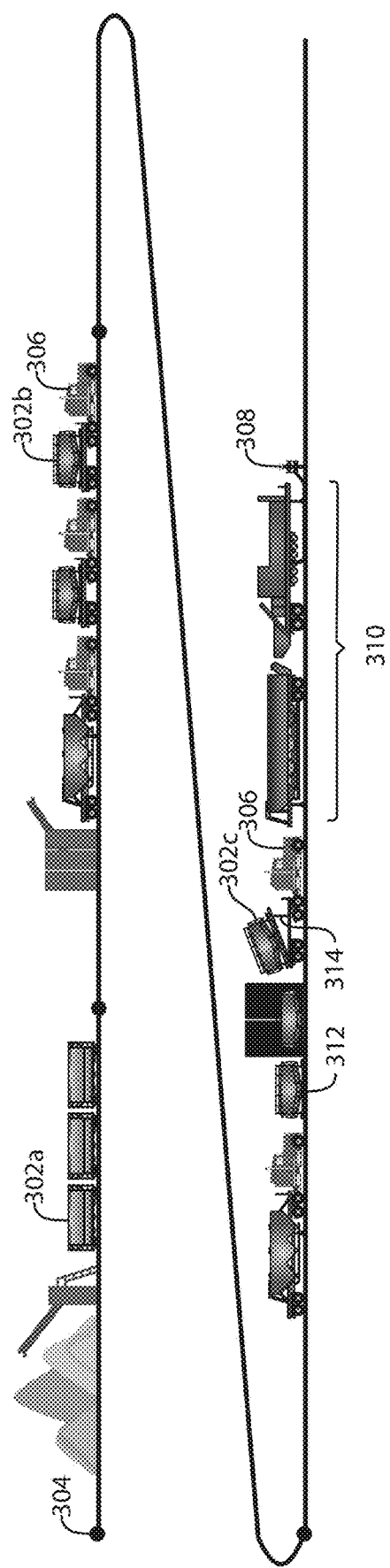
FIG. 3 illustrates a technique for staging deliveries using roll-off containers.
Figure 4:
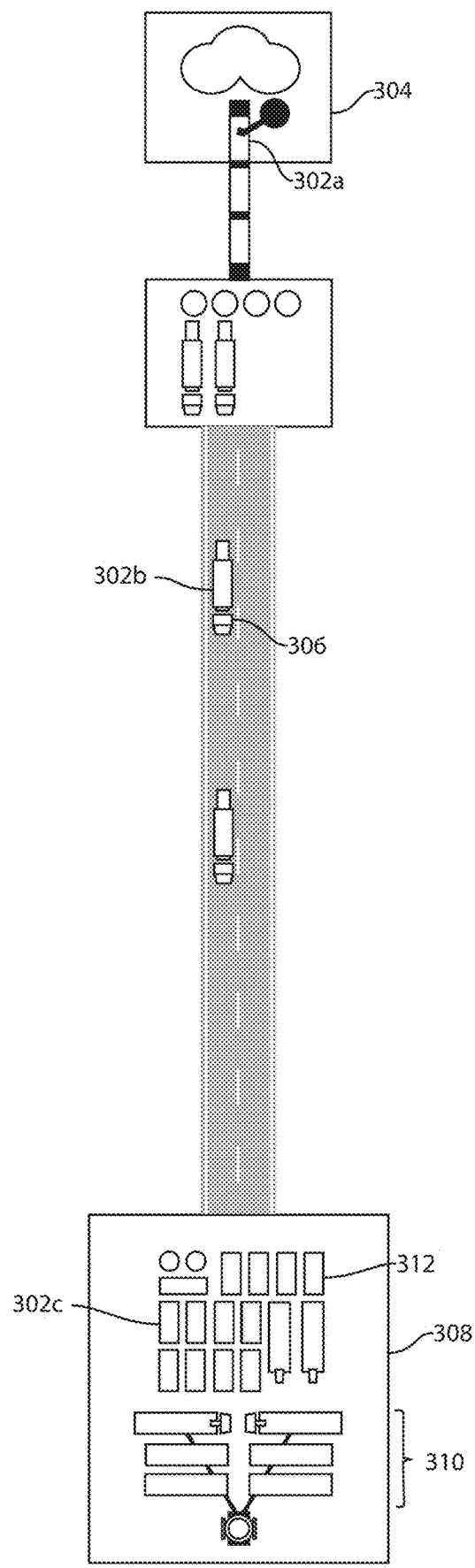
FIG. 4 illustrates a technique for staging deliveries using roll-off containers.

FIGS. 3 and 4 illustrate a technique for staging deliveries using roll-off containers. A roll-off container 302a (note that "302a", "302b", etc. refer to the same roll-off container at different points in time) is filled with a material at a loading site 304, such as a mine, to produce a filled roll-off container 302b. The word "filled" as used herein does not necessarily mean that the roll-off container 302b is completely full of material. The word "filled" and its variants is defined to mean that enough material is added to the roll-off container 302b to make it worthwhile to transport. In one or more embodiments, "filled" means at least 50 percent full, at least 40 percent full, or at least 60 percent full.

The filled roll-off container 302b is transported on a transport vehicle 306 to a use site 308, such as a well. The filled roll-off container 302c is rolled from the transport vehicle 306 at the use site 308. The material is then used at the use site 308. As can be seen, there is no need for the transport vehicle 306 to wait at the use site 308 until the hydraulic fracturing equipment 310 is ready to use the material carried by the filled roll-off container 302c. Since it is not necessary for transport vehicles, such as transport vehicle 306, to wait at the use site 308, there is less likelihood that a line of transport vehicles waiting to enter the use site 308 will develop. Further, additional filled roll-off containers 312 (only one is labeled) can be stockpiled at the use site 308, which reduces the likelihood that the hydraulic fracturing equipment 310 will run short of material, such as proppant, during a hydraulic fracturing operation. In addition, roll-off containers, such as roll-off container 302c, do not require special equipment, such as a fork lift or a crane, where they are unloaded because the transport vehicles, such as transport vehicle 306, are typically equipped with the necessary equipment, such as a roll-off hoist 314, which frees up additional space at the use site 308 where additional roll-off containers, such as roll-off container 306, can be stored.

In one or more embodiments, the roll-off container 302 and other roll-off containers mentioned herein are of the type described in U.S. patent application Ser. No. 15/449,270, entitled "Roll-off Transport Barrel with Gravity, Vacuum, and Pneumatic Loading and Unloading," filed on Mar. 3, 2017, which is incorporated by reference in its entirety. In one or more embodiments, the roll-off container is filled from the top.

Figure 5:
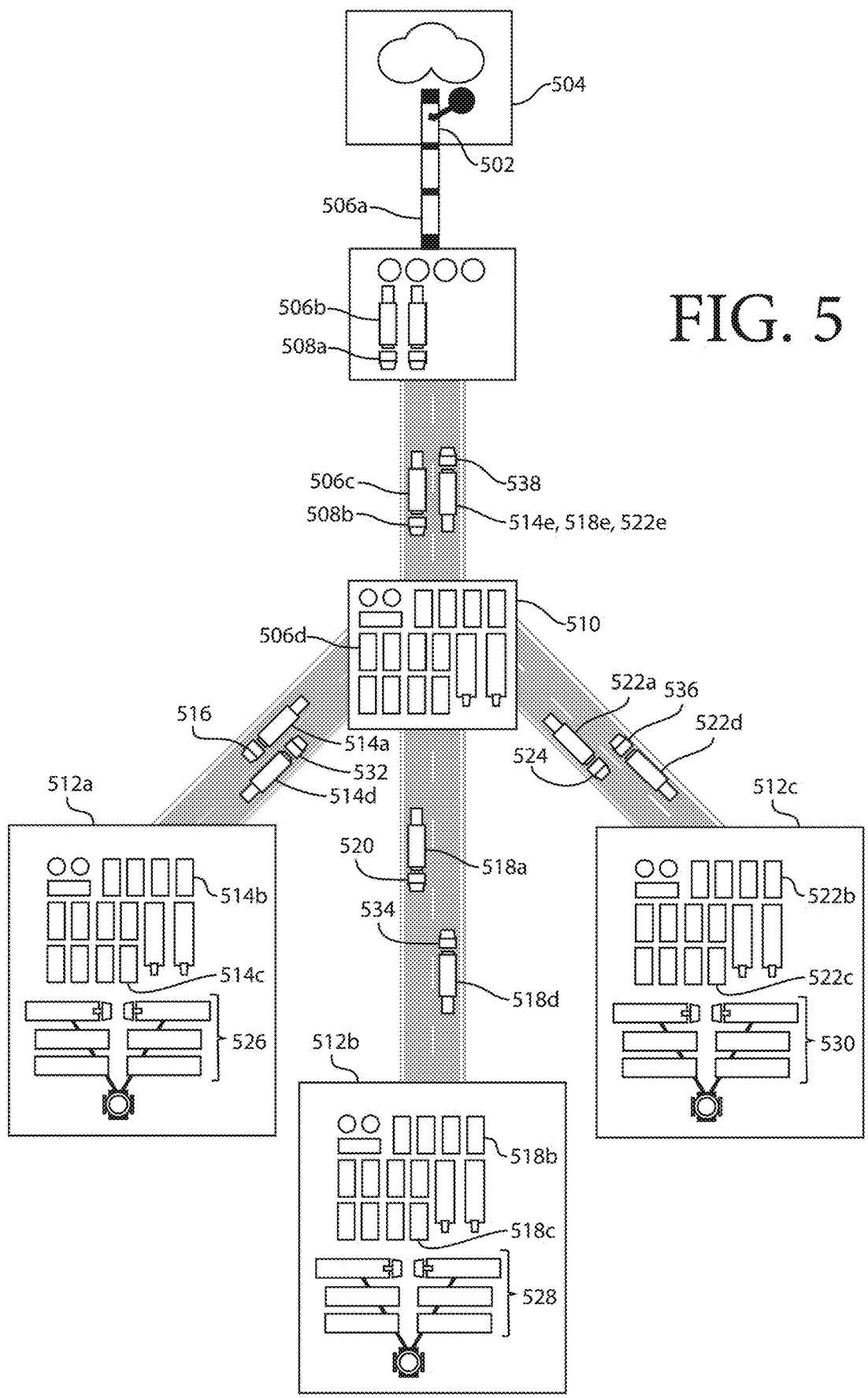
FIG. 5 illustrates a technique for staging deliveries using roll-off containers.

FIG. 5 illustrates another technique for staging deliveries using roll-off containers. A plurality of roll-off containers 502 (only one is labeled) is filled with a material at a loading site 504 to produce a plurality of filled roll-off containers 506a (only one is labeled, "506a", "506b", etc, refer to the same plurality of roll-off containers at different points in time). The filled roll-off containers 506b are rolled onto a first transport vehicle 508a ("508a", "508b", etc., refer to the same transport vehicle at different points in time; reference to a "transport vehicle" should be understood to include a plurality of transport vehicles). The plurality of filled roll-off containers 506c are transported on the first transport vehicle 508b to an in-bound staging location 510. The filled roll-off containers 506d are rolled from the transport vehicle to the in-bound staging location 510.

In this embodiment, the in-bound staging location 510 provides storage for roll-off containers, such as roll-off container 506, to fulfill the need for material, such as proppant, of a plurality of use sites 512a, 512b, 512c. In a sense, the in-bound staging location 510 provides a "buffer" to level or smooth the demand on the loading site 504 because of uneven requirements from the plurality of use sites 512a, 512b, 512c.

Continuing with the description of the technique illustrated in FIG. 5, a subset of the filled roll-off containers 514a (note that a "subset" can be any number up to the total number of filled roll-off containers) ("514a", "514b", etc, refer to the same subset of the filled roll-off containers at different points in time) at the in-bound staging location 510 is rolled onto a second transport vehicle 516. The subset of filled roll-off containers 514a is transported on the second transport vehicle 516 to a use site 512a. The material from the subset of filled roll-off containers 514b is used at the use site 512a.

Similarly, a second subset of the filled roll-off containers 518a ("518a", "518b", etc., refer to the same subset of the filled roll-off containers at different points in time) at the in-bound staging location 510 is rolled onto a third transport vehicle 520. The subset of filled roll-off containers 518a is transported on the third transport vehicle 520 to a use site 512b. The material from the subset of filled roll-off containers 518b is used at the use site 512b.

Similarly, a third subset of the filled roll-off containers 522a ("522a", "522b", etc., refer to the same subset of the filled roll-off containers at different points in time) at the in-bound staging location 510 is rolled onto a fourth transport vehicle 524. The subset of filled roll-off containers 522a is transported on the fourth transport vehicle 524 to a use site 512c. The material from the subset of filled roll-off containers 524b is used at the use site 512c.

The first subset of filled roll-off containers 514b is rolled off the second transport vehicle 516 at the use site 512a and the first subset of filled roll-off containers 514b is unloaded at the use site 512a, for use, for example, by hydraulic fracturing equipment 526 at the use site 512a, to produce a first plurality of empty roll-off containers 514c. It will be understood that the word "empty" as used herein does not necessarily mean that the roll-off container being referred to is completely empty of material; the word is defined to mean that enough material is removed from the roll-off container being discussed to make it unworthwhile to continue to remove material. In one or more embodiments, "empty" means no more than 10 percent full, no more than 5 percent full, or no more than 2 percent full.

The second subset of filled roll-off containers 518b is rolled off the third transport vehicle 520 at the use site 512b and the second subset of filled roll-off containers 518b is unloaded at the use site 512b, for use, for example, by hydraulic fracturing equipment 528 at the use site 512b, to produce a second plurality of empty roll-off containers 518c.

The third subset of filled roll-off containers 522b is rolled off the fourth transport vehicle 524 at the use site 512c and the third subset of filled roll-off containers 522b is unloaded at the use site 512c, for use, for example, by hydraulic fracturing equipment 530 at the use site 512c, to produce a third plurality of empty roll-off containers 518c.

It will be understood that the filled roll-off containers 514b, 518b, 522b can be unloaded while they are still mounted on their respective transport vehicles 516, 520, 524.

Once the roll-off containers are empty, they can be returned to the loading site 504 for reuse. Once again, the roll-off containers are not mounted on or secured to any particular transport vehicle and can be stored at the use site 512a, 512b, 512c or at the in-bound staging site 510 or another staging site (not shown) until a transport vehicle is available and/or they are needed at the loading site 504. Once they have been returned to the loading site 504, the cycle described above can begin again.

A subset of the empty roll-off containers 514d may be rolled onto a fifth transport vehicle 532 at the use site 512a. The subset of empty roll-off containers 514d may be transported to an out-bound staging location, which in the example shown in FIG. 5 is the same as the in-bound staging location 510. It will be understood that the out-bound staging location may be a different location than the in-bound staging location 510.

A subset of the empty roll-off containers 518d may be rolled onto a sixth transport vehicle 534 at the use site 512b. The subset of empty roll-off containers 518d may be transported to an out-bound staging location, which in the example shown in FIG. 5 is the same as the in-bound staging location 510. It will be understood that the out-bound staging location may be a different location than the in-bound staging location 510.

A subset of the empty roll-off containers 522d may be rolled onto a seventh transport vehicle at the use site 512c. The subset of empty roll-off containers 522d may be transported to an out-bound staging location, which in the example shown in FIG. 5 is the same as the in-bound staging location 510. It will be understood that the out-bound staging location may be a different location than the in-bound staging location 510.

A subset of the empty roll-off containers 514e at the out-bound staging location 510 may be rolled onto an eighth transport vehicle 538 and the subset of empty roll-off containers 514e on the eighth transport vehicle 538 may be transported from the out-bound staging location 510 to the loading site 504. A subset of the empty roll-off containers 518e at the out-bound staging location 510 may be rolled onto the eighth transport vehicle 538 and the subset of empty roll-off containers 518e on the eighth transport vehicle 538 may be transported from the out-bound staging location 510 to the loading site 504. A subset of the empty roll-off containers 522e at the out-bound staging location 510 may be rolled onto the eighth transport vehicle 538 and the subset of empty roll-off containers 522e on the eighth transport vehicle 538 may be transported from the out-bound staging location 510 to the loading site 504.

In one or more embodiments, the loading site 504 is at least 1 mile from the in-bound staging area 510. In one or more embodiments, the in-bound staging area is at least 1 mile from at least one of the use sites 512a, 512b, 512c.

It will be understood that, while eight transport vehicles have been identified in the discussion of FIG. 5, that the process can be performed by fewer transport vehicles. For example, transport vehicle 508 may be the same as transport vehicle 516.

Figure 6:
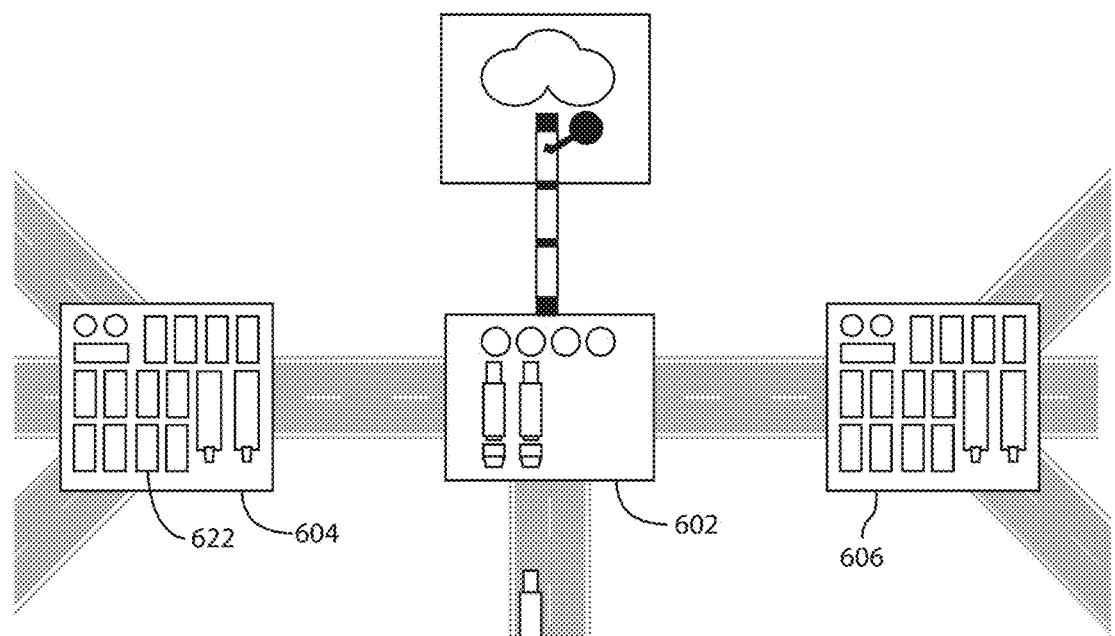
FIG. 6 illustrates a technique for staging deliveries using roll-off containers.
Figure 6:
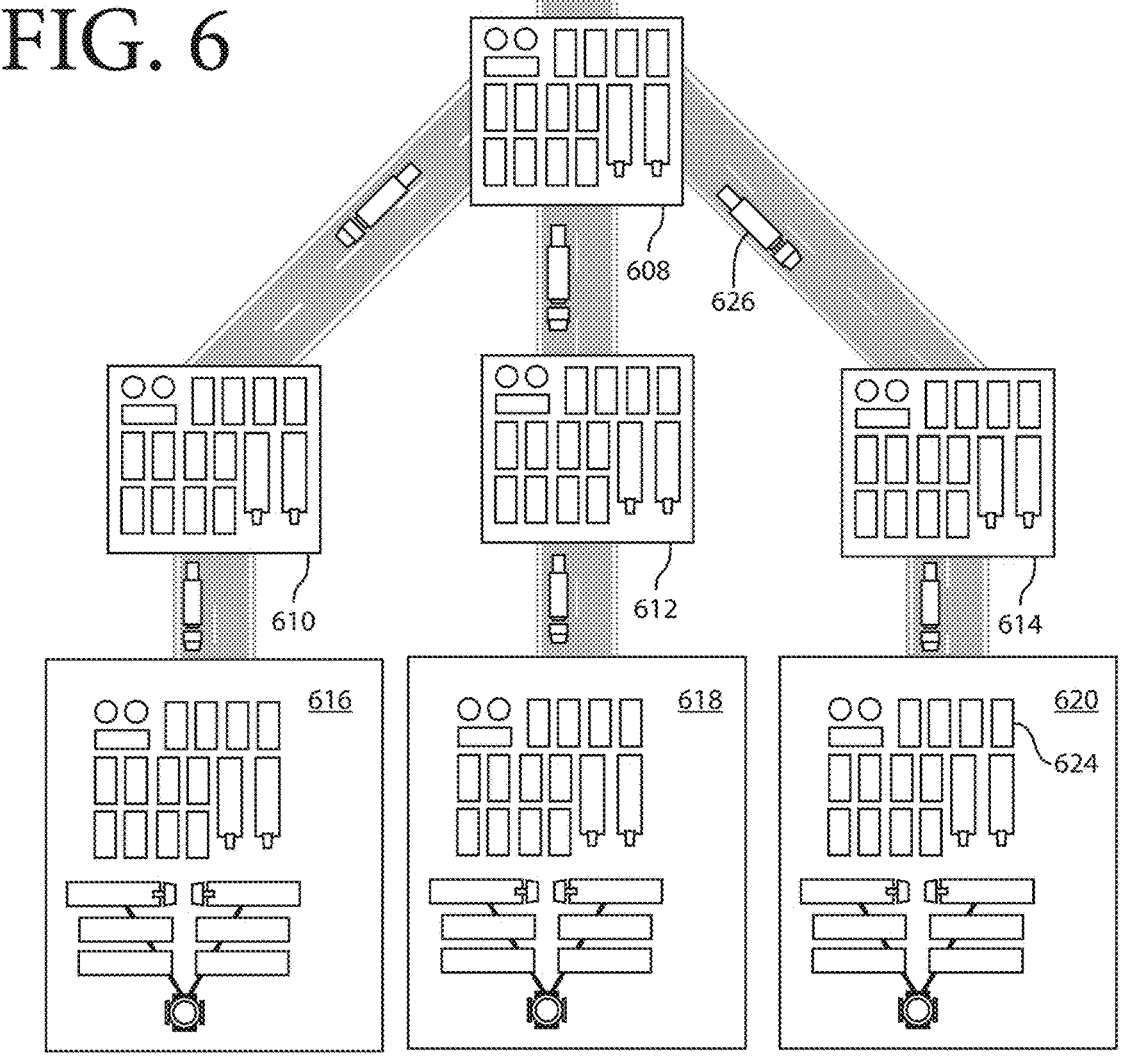

FIG. 6 illustrates a technique for staging deliveries using roll-off containers. As can be seen, FIG. 6 includes a plurality of in-bound storage locations 602, 604, 606, 608, 610, 612, 614 that are similar to and perform a similar function as in-bound storage location 510 shown in FIG. 5. FIG. 6 shows in-bound storage location 602 feeding in-bound storage locations 604, 606, and 608 and in-bound storage location 608 feeding in-bound storage locations 610, 612, and 614. In-bound storage location 604 and in-bound storage location 606 feed a plurality of additional in-bound storage locations and/or use sites (not shown). In-bound storage location 610 feeds use site 616. In-bound storage location 612 feed use site 618. In-bound storage location 614 feeds use site 620. Any or all of the in-bound storage locations 602, 604, 606, 608, 610, 612, 614 can be used as out-bound storage locations.

Filled roll-off containers 622 (only one is labeled) and empty roll-off containers 624 (only one is labeled) can be transferred among the in-bound storage locations 602, 604, 606, 608, 610, 612, 614 by transport vehicles 626 (only one is labeled) as is useful or necessary to provide for the demand of the use sites 616, 618, 620, and the unseen use sites.

In one aspect, a method includes filling a roll-off container with a material at a loading site to produce a filled roll-off container, transporting the filled roll-off container on a transport vehicle to a use site, rolling the filled roll-off container from the transport vehicle at the use site, and using the material at the use site.

Implementations may include one or more of the following. Filling the plurality of roll-off containers with the material at the loading site may include filling the plurality of roll-off containers from the top. The material may be a proppant used in hydraulic fracturing. The loading site may be a rail head. The use site may be a drill site.

In another aspect, a method includes filling a plurality of roll-off containers with a material at a loading site to produce a plurality of filled roll-off containers. The method further includes rolling the filled roll-off containers onto a first transport vehicle. The method further includes transporting the plurality of filled roll-off containers on the first transport vehicle to an in-bound staging location. The method further includes rolling the filled roll-off containers from the transport vehicle to the in-bound staging location. The method further includes rolling a subset of the filled roll-off containers at the in-bound staging location onto a second transport vehicle. The method further includes transporting the subset of filled roll-off containers on the second transport vehicle to a use site. The method further includes using the material at the use site.

Implementations may include one or more of the following. The method may include rolling the subset of filled roll-off containers off the second transport vehicle at the use site. The method may include unloading the subset of filled roll-off containers at the use site to produce a plurality of empty roll-off containers. The method may include rolling a subset of the empty roll-off containers onto a third transport vehicle at the use site. The method may include transporting the subset of empty roll-off containers to an out-bound staging location. The method may include rolling a subset of the empty roll-off containers at the out-bound staging location onto a fourth transport vehicle. The method may include transporting the subset of empty roll-off containers on the fourth transport vehicle from the out-bound staging location to the loading site. Using the material at the use site may include removing the material from the subset of filled roll-off containers at the use site while the subset of filled roll-off containers is still loaded on the second transport vehicle to produce a plurality of empty roll-off containers, transporting empty roll-off containers to an out-bound staging location, rolling a subset of the empty roll-off containers at the out-bound staging location onto a fourth transport vehicle, and transporting the subset of empty roll-off containers on the fourth transport vehicle from the out-bound staging location to the loading site. The in-bound staging location may include a plurality of in-bound storage locations. The method may include transporting an intermediate subset of the filled roll-off containers among the plurality of in-bound storage locations before rolling the subset of the filled roll-off containers at the in-bound staging location onto the second transport vehicle. Filling the plurality of filling the plurality of roll-off containers with the material at the loading site may include filling the plurality of roll-off containers from the top. The material may a proppant used in hydraulic fracturing. The loading site may be a rail head. The use site may be a drill site. The loading site may be at least 1 mile from the in-bound staging site. The in-bound staging site may be at least 1 mile from the use site. The first transport vehicle and the second transport vehicle may be the same vehicle. The first transport vehicle may include a roll-off hoist.

In another aspect, a method includes filling a plurality of roll-off containers with a material at a loading site to produce a plurality of filled roll-off containers. The method further includes rolling the filled roll-off containers onto a first transport vehicle. The method further includes transporting an intermediate subset of the filled roll-off containers among the plurality of in-bound storage locations. The method further includes transporting the intermediate subset of filled roll-off containers to an in-bound staging location. The method further includes rolling the intermediate subset of filled roll-off containers from the transport vehicle to the in-bound staging location. The method further includes rolling a subset of the intermediate subset of the filled roll-off containers at the in-bound staging location onto a second transport vehicle. The method further includes transporting the subset of the intermediate subset of the filled roll-off containers on the second transport vehicle to a use site. The method further includes using the material at the use site.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
   filling a roll-off container with a material at a loading site to produce a filled roll-off container, the roll-off container comprising:
   a barrel capable of vacuum loading and unloading, gravity unloading and loading, and pneumatic unloading; and
   a roll-off skid coupled to the barrel;
   wherein the barrel comprises:
   an upper concave section having:

a port side having a port-side v-shaped edge,
a starboard side having a starboard-side v-shaped edge,
an upper concave section front edge, and
an upper concave section rear edge;
a middle convex section having:
a port convex baffle having:
an upper v-shaped edge coupled to the port-side v-shaped edge of the upper concave section,
a lower v-shaped edge, and
a port convex section between the upper v-shaped edge and the lower v-shaped edge of the port convex baffle,
a starboard convex baffle having:
an upper v-shaped edge coupled to the starboard-side v-shaped edge of the upper concave section,
a lower v-shaped edge, and
a starboard convex section between the upper v-shaped edge and the lower v-shaped edge of the starboard convex baffle,
a middle convex section front edge, and a middle convex section rear edge,
a lower trough section coupled to the lower v-shaped edge of the port convex baffle and the lower v-shaped edge of the starboard convex baffle and having a lower trough section front edge and a lower trough section rear edge;
a front cap coupled to the upper concave section front edge, the middle convex front edge and the lower trough section front edge;
a rear cap coupled to the upper concave section rear edge, the middle convex rear edge and the lower trough section rear edge; and
a plurality of openings;
transporting the filled roll-off container on a transport vehicle to a use site;
using a roll-off hoist coupled to the transport vehicle to roll the filled roll-off container from the transport vehicle at the use site; and
using the material at the use site.

2. The method of claim 1 wherein filling the plurality of roll-off containers with the material at the loading site comprises:
filling the plurality of roll-off containers from the top.

3. The method of claim 1 wherein:
the material is a proppant used in hydraulic fracturing;
the loading site is a rail head; and
the use site is a drill site.

4. A method comprising:
filling a plurality of roll-off containers with a material at a loading site to produce a plurality of filled roll-off containers, the roll-off containers comprising:
a barrel capable of vacuum loading and unloading, gravity unloading and loading, and pneumatic unloading; and
a roll-off skid coupled to the barrel;
rolling the filled roll-off containers onto a first transport vehicle;
transporting the plurality of filled roll-off containers on the first transport vehicle to an in-bound staging location;
using a roll-off hoist coupled to the first transport vehicle to roll the filled roll-off containers from the transport vehicle to the in-bound staging location;
using a roll-off hoist coupled to a second transport vehicle to roll a subset of the filled roll-off containers at the in-bound staging location onto the second transport vehicle;
transporting the subset of filled roll-off containers on the second transport vehicle to a use site; and
using the material at the use site.

5. The method of claim 4 further comprising:
rolling the subset of filled roll-off containers off the second transport vehicle at the use site; and
unloading the subset of filled roll-off containers at the use site to produce a plurality of empty roll-off containers.

6. The method of claim 5 further comprising:
rolling a subset of the empty roll-off containers onto a third transport vehicle at the use site;
transporting the subset of empty roll-off containers to an out-bound staging location;
rolling a subset of the empty roll-off containers at the out-bound staging location onto a fourth transport vehicle; and
transporting the subset of empty roll-off containers on the fourth transport vehicle from the out-bound staging location to the loading site.

7. The method of claim 4 wherein using the material at the use site comprises:
removing the material from the subset of filled roll-off containers at the use site while the subset of filled roll-off containers is still loaded on the second transport vehicle to produce a plurality of empty roll-off containers;
transporting empty roll-off containers to an out-bound staging location;
rolling a subset of the empty roll-off containers at the out-bound staging location onto a fourth transport vehicle; and
transporting the subset of empty roll-off containers on the fourth transport vehicle from the out-bound staging location to the loading site.

8. The method of claim 4 wherein the in-bound staging location comprises a plurality of in-bound storage locations, and wherein the method further comprises:
transporting an intermediate subset of the filled roll-off containers among the plurality of in-bound storage locations before rolling the subset of the filled roll-off containers at the in-bound staging location onto the second transport vehicle.

9. The method of claim 4 wherein filling the plurality of filling the plurality of roll-off containers with the material at the loading site comprises:
filling the plurality of roll-off containers from the top.

10. The method of claim 4 wherein:
the material is a proppant used in hydraulic fracturing;
the loading site is a rail head; and
the use site is a drill site.

11. The method of claim 4 wherein
the loading site is at least 1 mile from the in-bound staging site; and
the in-bound staging site is at least 1 mile from the use site.

12. The method of claim 4 wherein:
the first transport vehicle and the second transport vehicle are the same vehicle.

13. A method comprising:
filling a plurality of roll-off containers with a material at a loading site to produce a plurality of filled roll-off containers, the roll-off containers comprising:

a barrel capable of vacuum loading and unloading, gravity unloading and loading, and pneumatic unloading; and a roll-off skid coupled to the barrel;

rolling the filled roll-off containers onto a first transport vehicle;

transporting an intermediate subset of the filled roll-off containers among the plurality of in-bound storage locations;

transporting the intermediate subset of filled roll-off containers to an in-bound staging location;

using a roll-off hoist coupled to the transport vehicle to roll the intermediate subset of filled roll-off containers from the transport vehicle to the in-bound staging location;

rolling a subset of the intermediate subset of the filled roll-off containers at the in-bound staging location onto a second transport vehicle;

transporting the subset of the intermediate subset of the filled roll-off containers on the second transport vehicle to a use site; and using the material at the use site.

* * * * *